United States Patent [19]

Huddleston

[11] Patent Number: 4,750,842
[45] Date of Patent: Jun. 14, 1988

[54] MIXING APPARATUS EMPLOYING A CAVITY TRANSFER MIXER

[75] Inventor: Elwyn Huddleston, Franklin, Ky.

[73] Assignee: The Kendall Company, Boston, Mass.

[21] Appl. No.: 76,454

[22] Filed: Jul. 22, 1987

Related U.S. Application Data

[63] Continuation-in-part of Ser. No. 909,527, Sep. 29, 1986, abandoned, which is a continuation-in-part of Ser. No. 857,692, Apr. 29, 1986, Pat. No. 4,692,352.

[51] Int. Cl.$^4$ ............................................. B29B 1/06
[52] U.S. Cl. ........................................ 366/91; 366/97; 425/205; 425/208
[58] Field of Search ............... 366/79, 91, 96, 97, 366/69, 73, 83, 84, 86, 88, 90, 98, 99; 425/200, 205, 208

[56] References Cited

U.S. PATENT DOCUMENTS

| | | | |
|---|---|---|---|
| 3,790,136 | 2/1974 | Koch | 366/86 |
| 3,941,357 | 3/1976 | Wurtz | 366/91 |
| 4,127,372 | 11/1978 | Perla | 425/205 |
| 4,416,543 | 11/1983 | Brinkman | 366/91 |
| 4,419,014 | 12/1983 | Gale | 366/99 |

Primary Examiner—Robert W. Jenkins
Attorney, Agent, or Firm—Alvin Isaacs

[57] ABSTRACT

Novel system for providing a homogeneous mixture of materials comprising an internal mixer, an extruder, a cavity transfer mixer, means for discharging a mix from the internal mixer directly into the extruder, said extruder and cavity transfer mixer being juxtaposed in fluid-tight arrangement whereby material traversing the length of the extruder passes directly into the cavity transfer mixer, means for injecting material into the cavity transfer mixer for admixture with material traversing therethrough from the extruder, output means for removing the resulting homogeneous mix from the cavity transfer mixer, and motor means for operating said internal mixer, extruder and cavity transfer mixer, said motor means comprising means for separately driving and varying the speed of said cavity transfer mixer, whereby said cavity transfer mixer is adapted for operation at varying speeds higher than said extruder.

14 Claims, 2 Drawing Sheets

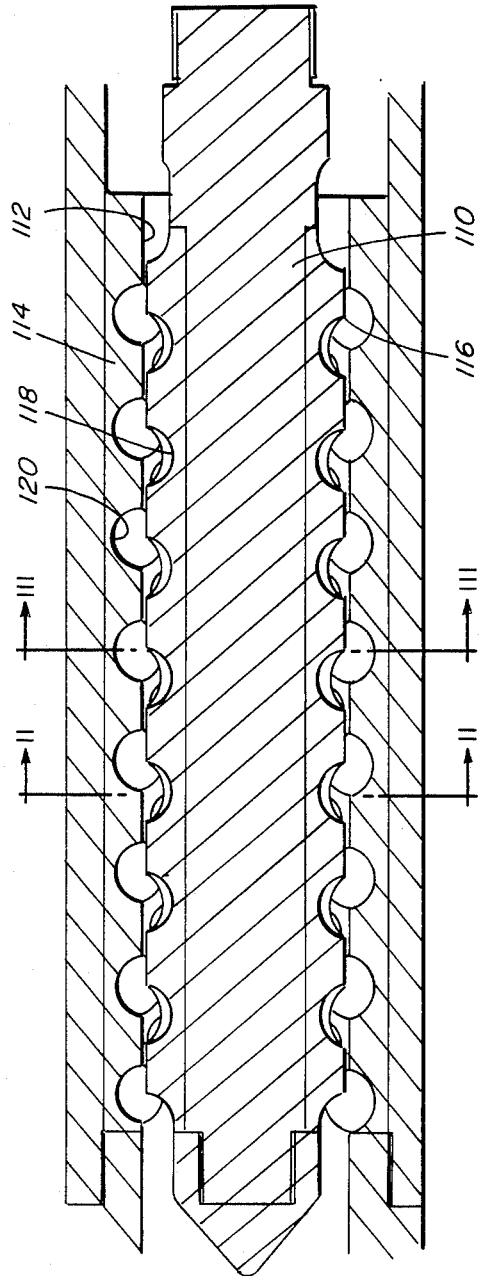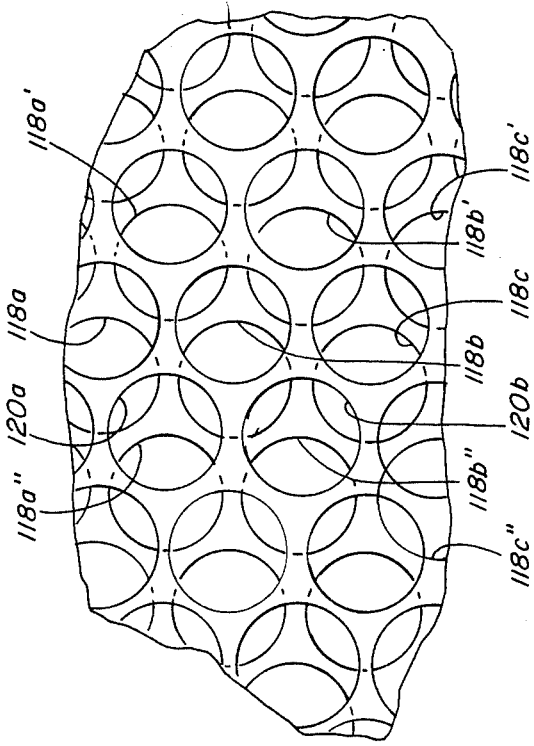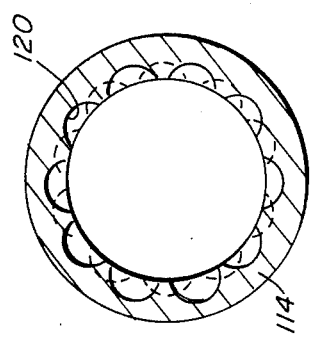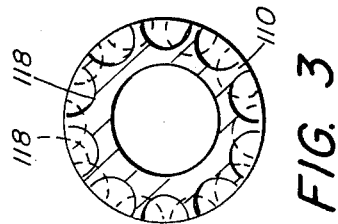

MIXING APPARATUS EMPLOYING A CAVITY TRANSFER MIXER

RELATED APPLICATION

This application is a continuation-in-part of U.S. application Ser. No. 909,527 filed Sept. 29, 1986, now abandoned, which in turn is a continuation-in-part of U.S. application Ser. No. 857,692 filed Apr. 29, 1986 now U.S. Pat. No. 4,692,352.

BACKGROUND OF THE INVENTION

The present invention is directed to novel apparatus including a cavity transfer mixer for preparing homogeneous mixtures of materials and, more particularly, for commercial preparation of such mixtures, e.g. to the manufacture of rubber-based compositions, adhesive formulations and other mixtures of solid materials.

Cavity transfer mixers are per se old and have been employed in various mixing operations.

In general, they are a form of extruder mixer wherein material is fed into one end and exits through an extruder die at the opposed end. They consist essentially of a hollow cylindrical stator member and a cylindrical rotor member which is rotatable therewithin. The facing cylindrical surfaces on the rotor and stator carry respective pluralities of rows of grooves or cavities positioned so as to cause a mixing as the material traverses the mixer.

British Specification No. 930,339 describes a cavity transfer mixer of this description wherein the grooves are elongate and longitudinally extending. The rows of grooves on each member extend peripherally around the member and are spaced apart axially, the rows on one member being axially offset from the rows on the other member so as to provide an axial overlap of the grooves in adjacent rows on the stator and rotor. Because of this arrangement of overlapping closed cavities on the rotor and stator, material passing through this mixer must travel a path which alternates between rotor and stator cavities. Where a cavity on one member happens to be opposite a land on the other member, the material to be admixed is subjected to simple shear so that it is cut in half before being displaced approximately at right angles to its original direction as it passes into the next cavity.

U.S. Pat. No. 4,419,014 relates to an improved cavity transfer mixer which is particularly efficacious in the practice of the present invention. In accordance with this patent, the rotor and stator cavities are formed as hemispheres arranged in a special configuration. Specifically, these hemispherical cavities are arranged in parallel rows on the rotor and stator such that: (a) the cavities in adjacent rows on the stator are circumferentially offset; (b) the cavities in adjacent rows on the rotor are circumferentially offset; and (c) the rows of cavities on the stator and rotor are axially offset, whereby an overall increase in mixing capacity for the same surface area can be obtained while achieving a desired exponential mixing characteristic in which simple shear mixing is repeatedly interrupted by cutting and turning stages.

The cavity transfer mixer disclosed in the aforementioned U.S. Patent is appreciably more efficient than that described in the British Patent. Specifically, the mixing capacity for the surface area is considerably increased. Moreover, other significant advantages are obtained. The configuration of hemispherical cavities can be arranged so that overlaps occur between three cavities at any given time so that extra mixing or blending is obtained by repeated division of the melt streams. The hemispherical shape of the cavities provides excellent streamlining so that, for example, stagnation will not occur. Other advantages are described in Col. 3.

The aforementioned parent application, Ser. No. 857,692, now U.S. Pat. No. 4,692,352, describes and claims a novel system for incorporating a rubber crosslinking agent in a rubber-based adhesive formulation wherein the crosslinking agent is admixed with the adhesive formulation in a cavity transfer mixer (CTM), e.g. a CTM of the type disclosed in the aforementioned U.S. Pat. No. 4,419,014, thereby providing significant manufacturing advantages. Preferably the crosslinker is incorporated in an oil or plastisizer vehicle. As described in the copending application, a premix of the rubber and other components is first formed in a Banbury in a batch operation. The premix is then transported to the input end of the extruder, to the output end of which the CTM is positioned. The CTM is provided near its leading end with an injection port through which the crosslinking agent is fed. As is discussed, the CTM may be threaded onto the exit end of the extruder or otherwise secured to the extruder. Alternatively, it may be a separately driven, variable speed CTM mounted or secured contiguous with the exit port of the extruder, e.g. by clamping means. In the latter embodiment, the CTM may have a diameter significantly greater than the extruder, thereby providing greater surface area for mixing in the CTM, which in turn allows the addition of larger quantities of additives, i.e. increases output.

Preferably, the process is operated as a continuous one where the premix from the Banbury drops directly into a continuously operating extruder and metered amounts of crosslinker are automatically fed into the CTM with the aid of per se known microprocessors. In other words, since the amount of premix exiting from the Banbury in a given batch time, e.g. 10 minutes is known, as is the rate of passage of the premix through the extruder, the required amount of crosslinker to be admixed can be determined and automatically metered into the CTM as the premix is continuously fed therethrough.

In this manner, employing a CTM in lieu of the 84 inch two-roll mill, a homogeneous adhesive mixture containing the crosslinker is instantaneously obtained and this premix may be immediately conveyed to a calender where the adhesive is applied to a suitable backing material to form an adhesive tape.

The copending application of Elwyn G. Huddleston (instant Applicant) and Richard J. Lacana, Ser. No. 892,677 filed Aug. 1, 1986, now U.S. Pat. No. 4,687,794, describes and claims another process for preparing rubber compositions employing a cavity transfer mixer. As described therein, a CTM is employed to incorporate tackifying resins into rubber compositions, including adhesive formulations.

In the preferred embodiments, as is described in this copending application, all of the components of the adhesive formulation except for the required amount of tackifier are first admixed in an internal mixer, most preferably a Banbury, in per se known manner to provide a substantially homogenous molten premix of the rubber and other components (filler, antioxidant, etc.)

The molten premix is then transported from the Banbury or other internal mixer to the CTM for the addition of the tackifier. Preferably, this is accomplished in a continuous rather than a batch operation wherein the premix is dropped from the internal mixer discharge hopper directly into the input end of a conventional extruder. The CTM is mounted or secured adjacent to the output end of the extruder so that the premix is conveyered to the CTM via the extruder.

In theory, the CTM may be threaded onto the output end of the extruder. Theoretically, the CTM may also be provided with a single port through which the resin is introduced. Both of these designs have utility for purposes of this invention. However, the usefulness of either or both of these constructions is limited from a manufacturing standpoint and consequently they are not preferred, at least with most adhesive systems which are contemplated.

Ser. No. 892,677, now U.S. Pat. No. 4,687,794, further discloses that experiments have shown that when a 6 row CTM was fitted directly with a Davis Standard 16:1 cold feed extruder, a maximum amount of about 5-6 percent resin can be incorporated. While this percentage of tackifier may be entirely adequate for some adhesives, higher amounts of this additive to the premix are required for adhesive formulations generally envisioned.

As is further disclosed in Ser. No. 892,677, now U.S. Pat. No. 4,687,794 the CTM is preferably detached from the extruder, and is independently driven so as to be capable of operating at variable speeds, including speeds appreciably higher than the extruder. In this manner, much greater quantities of resin may be incorporated, i.e. quantities typical of these commonly employed in the contemplated adhesives. It will of course be appreciated that where the CTM is detached and separately driven (as distinguished from being threaded to the extruder), it should nevertheless be mounted in juxtaposition with the extruder (by any per se known mechanical means) so that the molten mass of premix passes directly from the extruder to the CTM.

It is also disclosed to have been found that optimum results may be obtained by increasing the length of the CTM, e.g. to provide a nine row CTM. This may be accomplished simply by providing a single nine row CTM. Alternatively, it may be by means of a variable length CTM, e.g. two or more separate units in sealed relationship to prevent escape of material traveling downstream from one CTM to the next.

By way of illustration, a three row CTM may be fitted directly to a cold feed extruder, e.g. to the output end of a 2½" extruder. A 6 row variable speed, separately driven CTM may be placed in sealed relationship with the 3 row CTM.

While the CTM may theoretically be provided with a single entry port for feeding the resin, in the preferred embodiment multiple ports are provided along the path (length) of the CTM. By way of illustration, in the embodiment just described employing a 9 Row CTM, excellent results were obtained employing two entry ports for the resin. For example, with a nine row CTM in which the last six rows were driven independently, e.g. at 3-4 times the speed of the main extruder, two injection ports were found to be adequate for the addition of up to 23% hot resin.

Preferably, however, a 9 row unit which is entirely driven independently, will be provided with three spaced ports for injecting the resin, e.g. a first one just before the CTM, a second one at the 3 row position, and a third one at the six row position. It should be however noted, that it will not always be necessary to inject at all three positions. Nevertheless, the use of three ports will provide greater flexibility for the system.

BRIEF DESCRIPTION OF THE INVENTION

The present invention is directed to a novel apparatus for use in manufacturing processes for preparing compositions such as those described in the aforementioned copending applications, the essence of the invention being the combination of elements described therein including an internal mixer, an extruder and a variable speed separately driven CTM arranged so that a premix of materials prepared in the internal mixer is transported directly into the extruder and from there to the CTM where additional ingredients are introduced into the premix.

BRIEF DESCRIPTION OF THE DRAWING

FIG. 2 is a longitudinal section through the preferred cavity transfer mixer to be employed in accordance with the present invention;

FIG. 3 is a transverse section through the rotor alone, taken along the line II—II in FIG. 2;

FIG. 4 is a transverse section through the stator alone, taken along the line III—III in FIG. 2; and FIG. 5 is a developed view of part of the rotor and stator, illustrating the axial offset of the rows of hemispherical depressions in the rotor and stator.

DETAILED DESCRIPTION OF THE INVENTION

Figure 1:
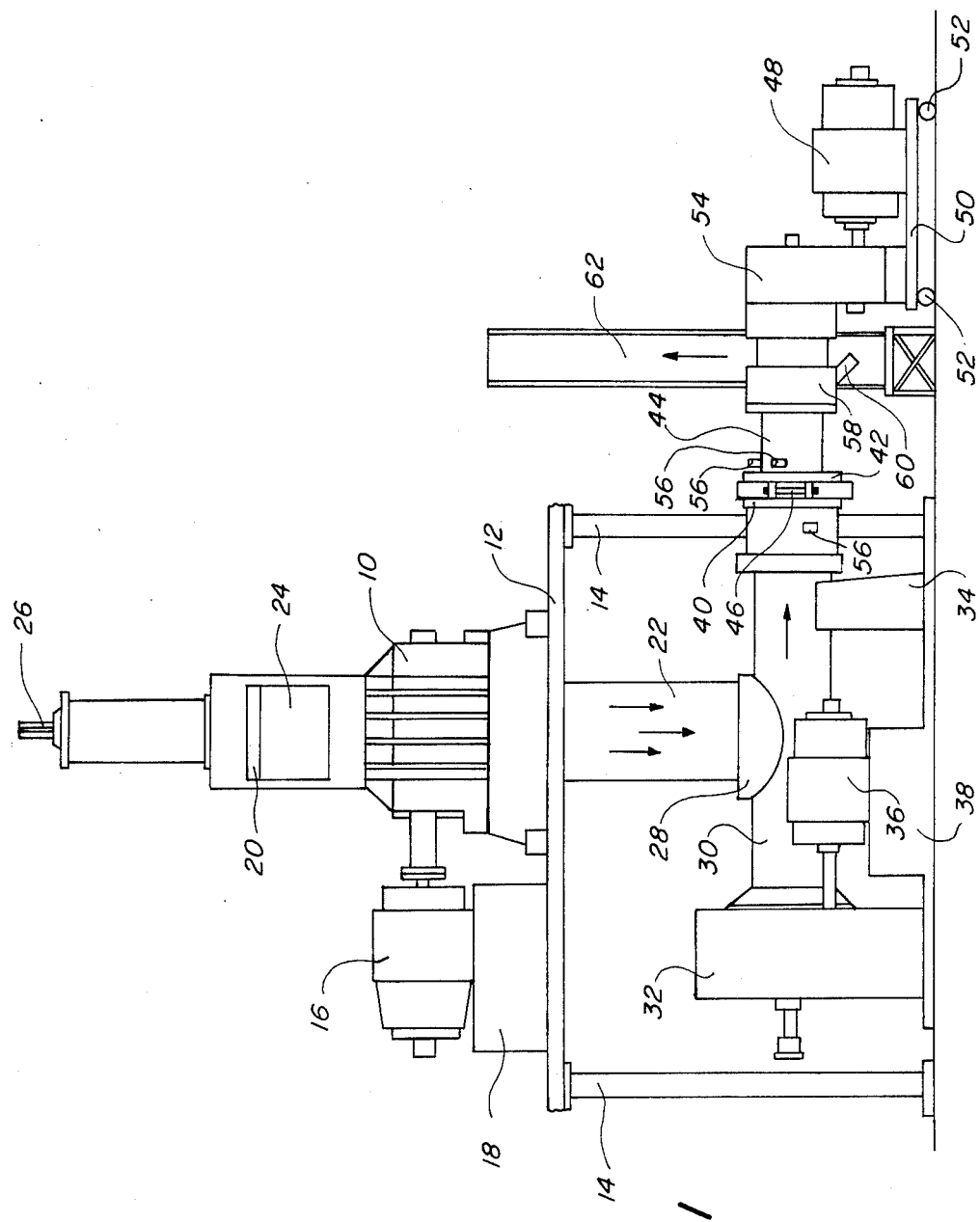
FIG. 1 is a schematic view illustrating the combination of elements of this invention.

As previously mentioned, the novel mixing system of this invention consists essentially of three mixing elements each of which is per se known and heretofore used in the rubber industry, namely (a) an internal mixer; (b) an extruder; and (c) a cavity transfer mixer, e.g. of the type described and claimed in the aforementioned U.S. Pat. No. 4,419,014. For a full appreciation of the nature and objects of the invention, it is appropriate to consider a brief history of the rubber manufacturing art.

In the early manufacture, the rubber was first cut and then placed in a mill that first masticated and then compounded it. In general, a mill consists of two parallel metal rolls so adjusted that the rubber could be ground and sheared between them. Mixing mills may typically vary from 20 to 84 inches in length and from 16 to 28 inches in diameter. Eighty-four inch rolls, generally regarded as the mechanical limit, are capable of handling a batch of 300 pounds of rubber in 25 to 40 minutes. The rolls are water-cooled internally. The tremendous power of these two rolls, operating at different speeds (the back roll turns faster than the front one; speed ratios from 1.2:1 to 1.5:1 are customary) coupled with slight oxidation and the heat generated by the resulting friction, eventually reduces the chunks of cold rubber into a plastisized sheet that adheres to one of the cylinders. A two-roll mill of this description is referred to as an external mixer.

As demands for manufacturing rubber products increased, a need was felt for larger, faster and more powerful machines. Today, nearly all rubber is processed initially in internal mixers such as the Banbury. These machines, which work by internal pressure and rotating parts, have a capacity which may typically range from 150 to 1000 pounds. As compared with the 25 to 40 minutes generally required with a two-roll mill for handling 150 to 300 pounds of rubber, the internal mixers may reduce this to, say, 5 to 8 minutes. In addition to saving time, a Banbury will produce a much more uniform or homogeneous product than that dependent upon hand operations on the external mill.

On the other hand, the high power requirements and the fact that the Banbury process is essentially batch-type mixing rather than continuous flow led to the development of mixer-extruders.

In a typical manufacturing process as employed in the rubber-based adhesive industry, the rubber, whether natural or synthetic, and most of the other ingredients are mixed in the Banbury to form what may be termed a "premix." This premix is discharged from the Banbury drop chute and then transported to an extruder which shapes it into strips or tubes. In general, an extruder for this purpose is a device for forcing the heat-softened rubber premix through orifices or dies. The rubber is ground in the extruder and forced through a heated die by means of a screw. The extruded material, which retains the shape of the die and may be circular or rectangular in cross-section and having a diameter varying from 1 to 8 inches, is then transported, e.g. on a conveyer, to the two-roll mill where the remaining ingredients, which could not be added under Banbury processing conditions, are then scooped or shoveled onto the milling premix. Following the milling operation, the resulting rubber-based composition is then transported to the remaining manufacturing steps, e.g. calendering, slitting, rolling up on cores and packaging.

Most recently, the cavity transfer mixer came into existence. The CTM, which may be considered to be a state-of-the-art form of an extruder-mixer, is only several inches in length and provides significant advantages, including those heretofore mentioned, over a milling operation. However, it lacks the capacity of and thus cannot replace the Banbury.

In any event, prior to the present invention, the processes for preparing rubber compositions was of the batch-type wherein a premix was formed in the Banbury (or other internal mixer) and the resulting premix was then transported to a two-roll mill and/or CTM for preparation of the final composition. As is understood by those skilled in the art, a batch operation has certain inherent disadvantages, chief of which are the manpower requirements, time, energy consumption, and lack of precise controls in product formulations.

The present invention is directed to a continuous operation which therefore obviates the above-noted problems of batch operation and permits precise and uniform formulations.

In accordance with the present invention, the premix formed in the internal mixer in per se known manner, is deposited from the drop chute of the internal mixer directly into the throat of the extruder of known type such as a Davis Standard 16:1 cold feed extruder. The premix exiting from the die at the output end of the extruder passes directly into a CTM provided with at least one port for introducing metered amounts of the material, e.g. tackifying resin, crosslinking agent or the like to be incorporated into the premix to form the desired composition.

While the input end of the CTM could be threaded onto the output end of the extruder, and the resulting combination then driven by a single motor, an essential part of this invention, as previously mentioned, is that the CTM is separately driven and possesses a variable speed, i.e. can be driven at higher speeds than the extruder in order to obtain material increases in output.

In the preferred embodiments, per se known microprocessors are employed to determine the amount of the premix and rate of flow through the extruder and thereby in turn to cause precise metered amounts of additive material to be introduced into the injection port or ports of the CTM. Also, as previously mentioned, in the preferred embodiments a plurality of injection ports are provided. In lieu of having the first such injection port adjacent the input end of the CTM, it may, if desired, be provided just prior to the output end of the juxtaposed extruder, so that at least a portion of the additive is introduced just before the premix enters the CTM. One or more additional injection ports may be positioned at spaced intervals along the path of the CTM.

As will be appreciated, the CTM is positioned adjacent or contiguous with the extruder where it is maintained in fluid-tight arrangement with the extruder by suitable connecting means in order to preclude escape or exudation of material traversing therethrough.

The invention will be further understood by reference to the accompanying drawings.

As shown in FIG. 1, the essential components of the novel mixing system of this invention are an internal mixer 10, an extruder 30, and a separately driven variable speed CTM 44.

Mixer 10 is illustrated to be a conventional Banbury mixer seated on a base 12 supported by columns or I-beams 14. In a typical manufacturing facility, base 12 would be the flooring of one level of the facility and the extruder and CTM would be on a lower level. Mixer 10 is operated by a motor 16 mounted on block 18. The mixer includes an inlet hopper 20 for feeding raw materials to be admixed and a drop chute 22 for discharging the mix. As is known, a Banbury mixer, as illustrated in the drawing, will also include a ram 24 driven by air pressure from a source (not shown) entering the mixer through air inlet pipe 26.

Drop chute 22 feeds the mix discharged from mixer 10 directly into the throat or input end 28 of extruder 30 mounted to and supported by end block 32 and support block 34. Extruder 30 is driven by motor 36 seated on block 38. The output end 40 of extruder 30 is positioned in a fluid-tight manner to the input end 42 of CTM 44 by means of clam-shell connector 46 so that material in the mix leaving the extruder is discharged without leakage directly into the CTM.

The CTM 44 is separately driven by means of motor 48 which, for purposes of illustration, is shown to be seated on trolley 50 having wheels 52 so that it is readily movable to and from the extruder. A gear box 54 is provided to enable the speed for driving the CTM to be variable, e.g. so that the CTM may be driven at variable speeds higher (faster) than the extruder.

The CTM has one or more injection ports 56 for introducing material into the moving mass in the CTM. For purposes of illustration, two such ports are shown. Other similar ports may be provided at varying distances along the path length of the CTM if found desirable or expedient to do so, as will be discussed in more detail hereinafter. Also as previously mentioned, an injection port 56 may be provided on the extruder, as illustrated.

The output end 58 of CTM 44 is shown to have a discharge pipe 60 from which the mix from the CTM is discharged onto an endless moving conveyor belt 62 for transport to the next manufacturing station, e.g., a packaging station, a calendering operation for coating onto a backing material to prepare tapes containing a layer of the mix, etc. As will be appreciated, intermediate stations may be provided for sampling the mix for quality control, etc.

As previously mentioned, the preferred CTM 44 is one such as is described and claimed in U.S. Pat. No. 4,419,014, the construction of which is shown in FIGS. 2-5, which are equivalent to FIGS. 1-4, respectively, of the patent.

The illustrated mixer includes a rotor 110 which is rotatably mounted within a basically cylindrical bore 112 in a stator 114. The right-hand end of the rotor 110, as viewed in FIG. 2, is adapted to be keyed to the output end of a screw conveyor (not shown), and the left-hand end of the stator 114 is adapted to be attached to an extrusion die (not shown) whereby material being processed, e.g. polymer, is forced between the rotor and stator in passing from the screw conveyor to the extrusion die. The arrangement described so far is conventional.

As shown in the drawings, the facing surfaces 116 and 112 on the rotor and stator are formed with respective pluralities of hemispherical cavities 118 and 120. The cavities 118 on the rotor are disposed in a plurality of circumferentially extending rows. As indicated in FIG. 3, FIG. 4 and FIG. 5, adjacent rows on the rotor are circumferentially displaced such that the center of each cavity in a given row lies midway between the centers of the two nearest cavities in each adjacent row. This can best be seen from the developed view of FIG. 5 where, for example, the circles 118a, 118b, 118c represent the cavities in one row on the rotor, and the circles 118a', 118b', 118c', 118a'', 118b'', and 118c'' represent the cavities in the adjacent rotor rows. It will be noted that the circle identified as 118b is offset in the circumferential direction from the adjacent circles 118a', 118b', 118a'' and 118b'' by half the distance between the centers of any two adjacent cavities in a row, e.g. between the centers of the cavities 118a and 118b.

In a similar manner, the cavities 120 on the stator, i.e. 120a and 120b, are disposed in a plurality of circumferentially extending rows, adjacent rows on the stator again being circumferentially displaced such that the cavities in a given row are offset by half the distance between the centers of any two adjacent cavities in a row.

In addition to the above described offset nature of the adjacent rows of cavities on the rotor and stator, the relative axial positions of the rows on the rotor and stator are also offset as best seen in FIG. 5, such that the circumferential line joining the center of any given row of cavities on the stator lies in the same axial position as a circumferential line positioned midway between the two circumferential lines joining the centers of the cavities in the two adjacent rotor rows. Thus, for example, in FIG. 5 the centers of the stator cavities 120a and 120b lie on a circumferential line positioned midway between the circumferential line joining the centers of rotor cavities 118a'', 118b'', 118c'' and the circumferential line joining the centers of the rotor cavities 118a, 118b, and 118c.

While the essential elements of the invention have been shown for purposes of illustration, it will be appreciated that other elements performing specific desired functions may and usually will be provided. For example, in the preferred contemplated use of the novel arrangement of elements, microprocessors of per se known description will be provided to determine the amount and rate of flow of material in the extruder which will in turn cause precise metered amounts of material to be introduced for admixture into the CTM via the injection port(s) 56. If the material to be injected is not sufficiently liquid or flowable for injection at room temperature, heating means may be provided to facilitate its introduction.

It will also be appreciated that the material entering the internal mixer 10 may be fed manually, e.g. by an operator stationed on a platform adjacent to inlet hopper 20 or, alternatively, means (not shown) may be provided for automatically feeding mixer 10.

From the foregoing description and illustrative drawing, the operation of the novel system of this invention will be apparent.

A supply of material to be introduced into the CTM is provided along with suitable metering valves and conduit means to the injection ports. As previously mentioned, if the material is not suitably fluid or flowable at room temperature, heating means are also provided to render it fluid for introduction through the injection port.

The motors for the respective elements are activated and the rubber and other components of the premix are fed into the Banbury. This may be done manually or by automatic means which would be readily apparent for those skilled in the art, and per se comprises no part of this invention. In like manner, the additive material may be introduced manually into the CTM. However, in the preferred system this is done automatically with the aid of per se known microprocessors, as previously described.

Material exiting the die of the CTM may be transported, as described, to the final manufacturing stations, e.g. calendering, packaging, etc.

The following examples show by way of illustration, and not by way of limitation, the practice of this invention.

EXAMPLE 1

The following ingredients were incorporated into a Banbury to provide a substantially homogeneous natural rubber premix:

| | |
|---|---|
| Natural Rubber (Smoked Sheet) | 193.0 lbs. |
| White Pigment (Titanox 2010) | 5.0 lbs. |
| Black Pigment (Butex) | 7.0 lbs. |
| Phenolic Resin Crosslinker (SP 1055) | 8.0 lbs. |
| Kaolin Soft Clay (McNamee Clay) Filler | 164.0 lbs. |
| Antioxidant | 2.5 lbs. |
| Modified Tall Oil Rosin Tackifier | 68.0 lbs. |
| Zinc Oxide | 9.0 lbs. |
| Approximately | 442.0 lbs. |

An existing 3 Row CTM was fitted directly with a Davis Standard 16:1 cold feed extruder. An existing 6 Row CTM was then fitted to a drive shaft capable of being driven from a 1½" Prodex extruder. An exit sleeve was constructed between the 6 Row CTM and the Prodex barrel. An injection port was provided just prior to the output end of the 2½" extruder, i.e. just before the 3 Row CTM; and a second injection port was provided between the 3 Row and 6 Row CTM's. The extruder and CTM's were set for 160° C. (320° F.). The speed of the 2½" extruder was set at about 10 RPM; and the speed of the separately driven 6 Row CTM was set at about 80-90 RPM. The premix from the Banbury was fed into the extruder and resin STA TAC B (trademark of Reichhold Co. for a polymerized petroleum hydrocarbon tackifier) was pumped into the two injection ports at a speed of about 137.5 g/min to provide a natural adhesive mix output at the rate of 36 kg/hr and which contained about 22.9% by weight.

EXAMPLE 2

The following ingredients were incorporated in a Banbury to provide a substantially homogeneous butyl rubber premix comprising:

| Butyl Rubber | 76.0 lbs. |
|---|---|
| Reclaimed Butyl Rubber | 145.0 lbs. |
| Indopol H100 | 63.5 lbs. |
| (polybutene tackifier) | |
| McNamee Clay | 220.0 lbs. |
| Antioxidant | 2.5 lbs. |
| (Agerite Stalite S) | |
| Approximately | 507.0 lbs. |

An extruder, 3 Row CTM and 6 Row CTM construction as described in Example 1 was employed. However, the 2½" extruder was set at 14 RPM and the separately driven 6 Row CTM at 50 RPM (approximately 3.5 times faster than the extruder.) The butyl premix was fed into the extruder and Piccopale 100 (trademark of Hercules Co., for a aliphatic hydrocarbon tackifier resin) was pumped into the two injection ports at a speed of about 115 g/min to provide a butyl rubber adhesive mix output at the rate of 40.4 kg/hr and which contained about 17% resin by weight.

In the foregoing illustrative examples it will be seen that, in each instance, a portion of the desired amount of tackifier was incorporated in the Banbury, the remainder being added in the CTM. It is to be noted, however, that it is entirely possible to incorporate substantially all of the resin and plasticizer via the CTM. In order to do so, a somewhat longer CTM may be needed. As will be appreciated by those skilled in the art, however, it may be expedient or advisable to incorporate at least plasticizing amounts of resin in the Banbury mix.

The adhesive formulations prepared above were calendered onto backings in known manner to prepare adhesive tapes which were then compared to adhesive properties with control tapes of similar formulations prepared in the conventional (prior) manner. The adhesive properties of the test tapes were comparable and well within the prescribed limits.

From the foregoing illustrative examples it will be seen that the present invention provides an elegant manufacturing process for preparing rubber-based adhesives comparable in adhesive characteristics to those prepared by the prior art systems commonly employed. In other words, the adhesives so produced by the present invention are not necessarily better. However, the manufacturing process is vastly superior.

It will be apparent that the usefulness of the present invention is not restricted to the rubber industry, but may find use in other industries as well, e.g. in the manufacturing of various solid or semi-liquid products containing a homogeneous mixture of dispersion of particulate matter.

Since certain changes may be made without departing from the scope of the invention herein described, it is intended that all matter contained in the foregoing description, including the drawing, shall be taken as illustrative and not in a limiting sense.

I claim:
1. System for providing a homogeneous mixture of materials comprising an internal mixer including input means for inserting materials to be admixed, mixing means for admixing said materials inserted in said internal mixer, and output means for removing said mixture from said internal mixer; an extruder having an input means through which material is introduced, an output means through which material exits, and motor means for driving said extruder; and a cavity transfer mixer having an input means for introducing material for admixture, an output means through which material exits from said cavity transfer mixer, motor means for driving said cavity transfer mixer, and means for varying the speed for driving said cavity transfer mixer, said input means of said extruder being arranged with respect to said internal mixer so that said mix discharged from said internal mixer may be introduced into said input means of said extruder, said input means of said cavity transfer mixer being in fluid-tight position with respect to the output means of said extruder whereby material in said extruder is discharged directly into said cavity transfer mixer, said extruder and said cavity transfer mixer being separately driven by said respective motor means.

2. A system as defined in claim 1 wherein at least one of said extruder and said cavity transfer mixer includes an entry port for introducing an additive for admixture with material passing therethrough.

3. A system as defined in claim 2 wherein said entry port is positioned on said extruder adjacent the output means thereof.

4. A system as defined in claim 2 wherein said cavity transfer mixer contains at least two of said entry ports at spaced intervals between the input and the output means thereof.

5. A system as defined in claim 1 wherein said internal mixer is a Banbury mixer.

6. A system as defined in claim 5 wherein the output means of said internal mixer comprises a drop chute.

7. A system as defined in claim 6 wherein the input means of said extruder comprises an opening positioned directly below said drop chute, whereby material exiting said drop chute is gravity-fed into said opening of said extruder.

8. A system as defined in claim 1 wherein said cavity transfer mixer consists essentially of a hollow cylindrical stator member and a cylindrical rotor member rotatable therewithin, the facing cylindrical surfaces on said rotor and stator carrying respective pluralities of cavities positioned so as to cause a mixing as the material traverses the mixer from the entry port thereof to the exit port thereof, said cavities being hemispherical and arranged in parallel rows on said rotor and stator such that: (a) the cavities in adjacent rows on said stator are circumferentially offset; (b) the cavities in adjacent rows on said rotor are circumferentially offset; and (c) the rows of the cavities on said rotor and stator are axially offset, whereby an overall increase in mixing capacity for the same surface area is obtainable while achieving a desired exponential mixing characteristic in which simple shear mixing is repeatedly interrupted by cutting and turning stages.

9. A system for admixing solid materials to form a substantially homogeneous mixture thereof wherein a premix of components thereof is first formed in a first mixing operation and at least one additional component of said mixture is thereafter incorporated in said premix in a second mixing operation, said system comprising:

a Banbury mixer including means for introducing said premix components for admixture and a drop chute through which said premix is discharged from Banbury mixer;

an extruder having a throat at one end for receiving material and output means at the opposed end through which material traversing said extruder is discharged, said throat of said extruder being positioned beneath said drop chutes of said Banbury mixer, whereby said premix discharged from said Banbury mixer is fed by gravity into the throat of said extruder;

a cavity transfer mixer comprising a hollow cylindrical stator member and a cylindrical rotor member rotatable therewithin, said cavity transfer mixer having an input end for feeding material and an output end for discharging said material, said cavity transfer mixer or said extruder further including at least one injection port for introducing an additive for admixture with material traversing therethrough, said input end of said cavity transfer mixer being contiguous with said output means of said extruder and in fluid-tight relationship therewith, whereby said premix passing through said extruder is fed directly into said cavity transfer mixer;

motor means for separately driving said extruder and cavity transfer mixer; and means for varying the speed of said cavity transfer mixer whereby said cavity transfer mixer can operate at variable revolutions per minute the same or greater than those of said extruder.

10. A system as defined in claim 9 wherein said extruder is a cold feed extruder.

11. A system as defined in claim 9 wherein said means for varying the speed of said cavity transfer mixer comprises gear means.

12. A system as defined in claim 9 wherein said cavity transfer mixer has at least two said injection ports.

13. A system as defined in claim 9 wherein each of said extruder and cavity transfer mixer are cylindrical in shape.

14. A system as defined in claim 13 wherein the diameter of said cavity transfer mixer is greater than the diameter of said extruder.

* * * * *